United States Patent [19]

Sykora et al.

[11] Patent Number: 4,680,989

[45] Date of Patent: Jul. 21, 1987

[54] HYDRAULIC SHIFT CONTROL DEVICE FOR AN AUTOMATIC TRANSMISSION HAVING TWO GEAR RATIOS

[75] Inventors: Jan Sykora; Jan Wangler, both of Prague, Czechoslovakia

[73] Assignee: PRAGA-Zavody Klementa Gottwalda, narodni podnik, Prague, Czechoslovakia

[21] Appl. No.: 814,642

[22] Filed: Dec. 30, 1985

[30] Foreign Application Priority Data

Dec. 28, 1984 [CS] Czechoslovakia ............... 10512-84
Nov. 5, 1985 [CS] Czechoslovakia ............... 7939-85

[51] Int. Cl.⁴ .................................. B60K 41/06
[52] U.S. Cl. ................................ 74/867; 74/868; 74/878
[58] Field of Search ............ 74/867, 868, 863, 865, 74/878

[56] References Cited

U.S. PATENT DOCUMENTS

| 4,041,810 | 8/1977 | Harmon et al. | 74/868 |
| 4,075,912 | 2/1978 | Schaefer | 74/868 X |
| 4,126,154 | 11/1978 | McQuinn | 74/868 X |
| 4,394,827 | 7/1983 | Kubo et al. | 74/865 X |
| 4,406,181 | 9/1983 | Kubo et al. | 74/868 X |

Primary Examiner—Rodney H. Bonck
Assistant Examiner—David A. Testardi

[57] ABSTRACT

A vehicle speed-dependent and engine load-dependent hydraulic control device for heavy vehicles shifting between two gear ratios is provided with a modulator valve modulating main input pressure by action of the engine load-dependent pressure, a shift valve shiftable by action of modulated pressure supplied to the shift valve from the modulator valve through a signal valve and a signal valve shifting down by the action of a spring and the engine load-dependent pressure and viceversa by the action of vehicle speed-dependent pressure. The control device is further provided with a pilot shuttle valve controlling supply of the higher of two pressures, the load-dependent pressure and a limiting pressure to the signal valve to shift down according to the operator's command.

2 Claims, 1 Drawing Figure

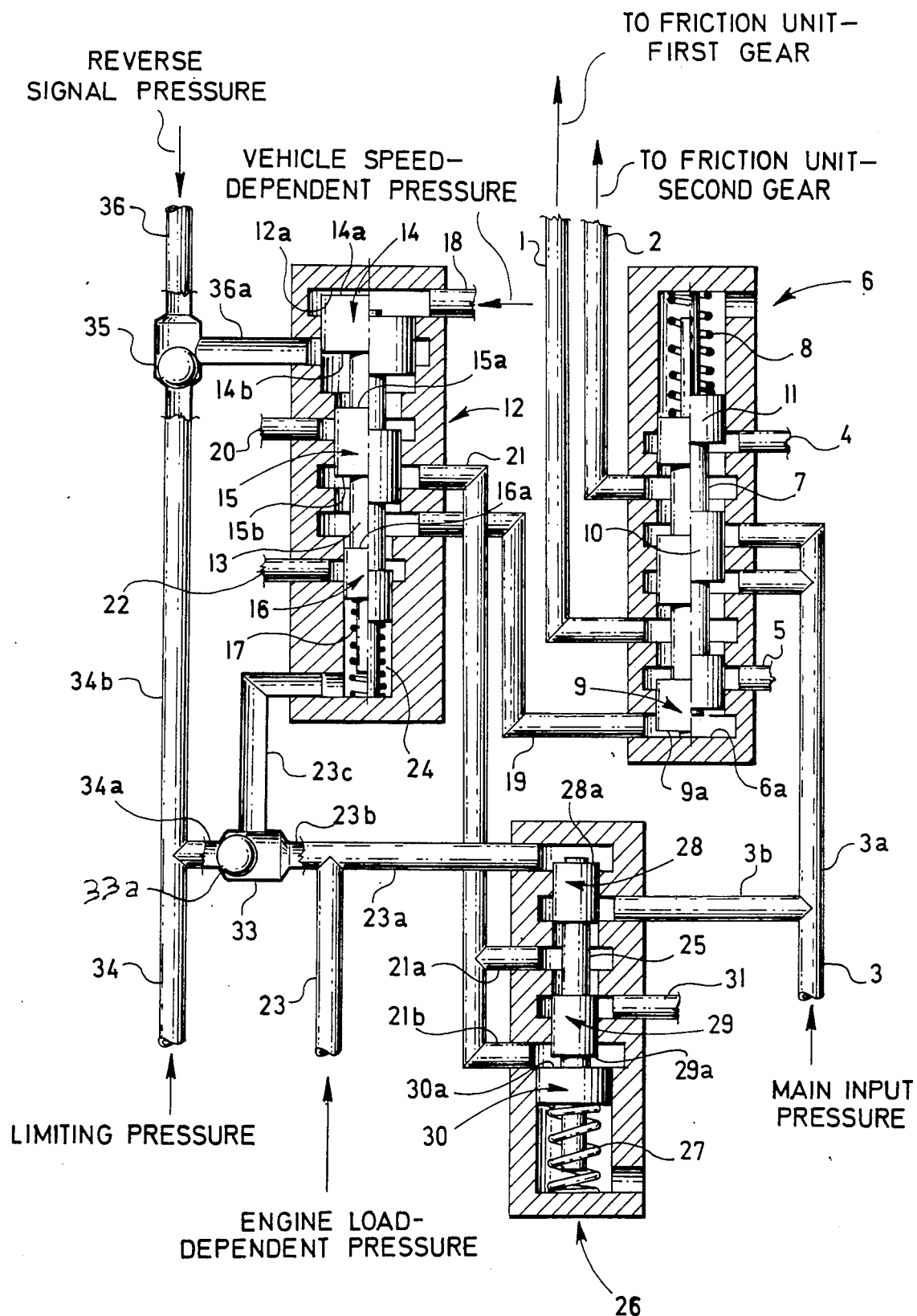

HYDRAULIC SHIFT CONTROL DEVICE FOR AN AUTOMATIC TRANSMISSION HAVING TWO GEAR RATIOS

FIELD OF INVENTION

The present invention relates to a vehicle-speed and engine load-dependent hydraulic shift control device for an automatic power transmission for automobiles.

BACKGROUND OF THE INVENTION

In a known automatic power transmission mechanism, the gear ratios are shifted between each other by selectively actuating fluid operated friction engaging means, for example, drive clutches or brake bands. To effect shifting between the gear ratios of known hydraulic control devices or passenger or personal cars special shift valves are used having spools provided with a number of circumferential lands, wherein the position of the spool is controlled by an operating fluid distributed directly to the shifting members. As the quantity of distributed fluid increases with the transmitted power while the sensitivity of the control device decreases with the quantity of distributed fluid, such control devices cannot be used for heavy vehicles of high-power. There is known a hydraulic control device for the automatic control of power transmission of heavy vehicles which is a system employed in Allison automatic transmission model AT 540 published in Service Manual of Allison Division of General Motors, Box 894, Indianapolis, IN 46206.

These known hydraulic control devices for automatic power transmission of heavy vehicles use for shifting between two gear ratios a known shift valve, having a spool shiftable between the initial first position allowing to connect the low-speed friction engaging means with the main input pressure source while discharging actuating pressure from the high-speed friction engaging means and between alternate second position allowing to connect the high-speed friction engaging means with the main input pressure source while discharging actuating pressure from the low-speed friction engaging means. The position of the shift spool is controlled by the main input pressure supplied to the terminal work face of the outer circumferential land of the said shift spool. The main pressure acting on the terminal work face of the outer land initiates the shifting of the shift spool from initial first position to alternate second position and the high-speed friction engaging means are actuated. The shift spool is urged by a spring against the opposite acting main pressure into the initial first position and after the main pressure disappears, the shift spool returns by action of a spring to the initial first position and the low-speed friction engaging means are in this way actuated.

The main pressure acting on the terminal work face of the outer land of the shift spool is delivered through a signal pressure conduit from a known signal valve having a shiftable multi-spool provided with a number of circumferential lands, the spool forced into an initial first position by a spring, allowing in the initial first position discharging of main pressure from the signal pressure conduit and closing the input of the main pressure into the signal valve.

The multi-spool is shifted toward alternate second position by action of a vehicle speed-dependent pressure and modulated pressure, modulated pressure being formed in a separated valve as inverse proportion to the engine load-dependent pressure. In alternate second position of the multi-spool the connection of the main input pressure source through the signal valve to the shift valve is allowed. The forces resulting of the speed-dependent and load-dependent pressures acting on the spool are of the same direction opposite to the action of the spring urging the spool back toward the initial first position.

In this respect the rigidity of the said spring is to be substantial. A high rigidity of the said spring, however, increases the forces opposing the movement of the spool. The intensity of such opposing forces is variable along the spool travel and cannot be foreseen. For this reason a strong spring is undesirable.

It proved to be unsuitable to shift the signal spool by action of nothing but the spring and it became necessary to exert the speed-dependent pressure on the spool in opposite direction to the load-dependent pressure.

The present invention provides a solution to such problem,.

SUMMARY OF THE INVENTION

It is an object of the invention to provide a vehicle speed- and engine load-dependent hydraulic control device for heavy vehicles for shifting between two gear ratios provided with a simple signal valve having substantially lower passive resistance than the known devices and shifting down by action of the engine load-dependent pressure.

A further object of the invention is to provide a simple hydraulic control device of above mentioned art, allowing by a simple way downshifting according to the operator's intervention into the automatic shifting process.

Another object to the invention is to provide a simple hydraulic control device of the above mentioned art, allowing blocking of the higher gear ratio by a pressure signal from a reversing means.

In accordance with the present invention, briefly stated, there is provided a hydraulic shift control device for an automatic vehicle transmission having two gear ratios, the low speed and the high speed ratio, shiftable between each other by selectively actuating fluid operated first and second friction engaging means, respectively, according to the vehicle speed- and engine load-conditions and operators commands, comprising a shift valve with a spool shiftable between two positions, in initial first and alternate second position connecting main input pressure circuit with second and first friction engaging means respectively, while discharging actuating pressure from the first and second friction engaging means respectively, said spool shiftable from the initial first to the alternate second position by action of modulated pressure, the modulated pressure being of inverse proportion to engine load-dependent pressure, said modulated pressure formed in a separate modulator valve and supplied to the shift valve through a signal valve, further comprising a modulator valve modulating main input pressure in inverse proportions to and by action of the engine load-dependent pressure, further comprising a single valve, having a three-land spool, shiftable from an initial first to an alternate second position by action of a vehicle speed-dependent pressure and from an alternate second to an initial first position by action of a load-dependent pressure and of a spring, the said spool allowing in the first initial position the modulated pressure to pass through the signal valve to the shift valve and comprising a two-inlet pilot shuttle valve open into the signal valve and allowing a higher of two pressures, the engine load-dependent pressure and operator controlled limiting pressure to pass to the signal valve and to urge together with a spring the signal valve spool to the initial first position.

BRIEF DESCRIPTION OF THE DRAWING

The features and advantages of a hydraulic shift control device according to the present invention will become more apparent from the following description, reference being made to the accompanying drawing, in which:

The single FIGURE of the drawing is a schematic view of the preferred embodiment of the invention. In such view the shift valve and the signal valve have the movable valve element or spools thereof shown in two alternative positions, the right hand portion of the spool of the shift valve being shown in its upper position, and the left hand half of such spool being shown in its lower position. The signal valve is shown with its right hand half in its lower terminal position, and its left hand half in its upper terminal position.

DESCRIPTION OF THE PREFERRED EMBODIMENT

The hydraulic shift control device is supplied to a known automatic power transmission mechanism to be of two forward speeds shifted between each other by selectively actuating two known fluid operated friction engaging means, for example, brake bands, first and second friction engaging means respectively contributive to production of the first (low speed) and second (high speed) drive gear ratios. The two friction engaging means (not shown in the FIGURE) are connected to the fluid outlets of the shift valve to actuating pressure conduits 1 and 2 as shown on the FIG. 1 leading to first actuating pressure circuit and second actuating pressure circuit respectively.

The shift valve 6 includes a shift valve spool 7 provided with three circumferential lands 9, 10 and 11, the first one outer land 9 with a terminal work face 9a, the second one inner land 10 and the third one outer land 11. The casing of valve 6 has a lower inner terminal surface 6a.

The shift valve is further connected to the main input pressure conduit branch 3a supplying to the shift valve 6 the main input pressure through the main input pressure conduit from a known pressure source (not shown in the FIGURE). The shift valve 6 further includes two drain ports, the first drain port 5 for discharging the actuating pressure from the first friction engaging means and the second drain port 4 for the discharging the actuating pressure from the second friction engaging means. The terminal work face 9a of the first land is exposed to a modulated pressure which is admitted through a modulated pressure line 19 and is of inverse proportion to the engine load. The shift valve spool 7 is biased downwardly (as shown at the left hand side of spool 7) towards the initial first position by a coil compression spring 8 exerting a force on a spool 7, in an opposite direction to the modulated pressure. In initial first lower position the spool 7 bears against the inner wall surface 6a of the shift valve 6 and the second land 10 allows the main input pressure to pass to the second actuating pressure circuit 2 while the first land 9 allows discharging of the actuating fluid from the first actuating pressure circuit 1 through the shift valve 6 to the first drain port 5. The modulated pressure admitted to the shift valve 6 exerts a higher force on the shift valve spool 7 than the opposite spring 8. By admission of the modulated pressure of the shift valve 6 the shift valve spool 7 is therefore shifted to the alternate second, upper position wherein the second land 10 allows the main input pressure to pass through the shift valve 6 to the first actuating pressure circuit 1 while the third land 11 allows discharging of the actuating fluid from the second actuating pressure circuit 2 through the shift valve 6 to the second drain port 4. After the modulated pressure disappears the shift valve spool 7 returns by action of the spring 8 to the initial first position.

The modulated pressure is delivered to the shift valve 6 from a single valve 12 through the modulated pressure line 19. The signal valve 12 is provided with an outlet to the modulated pressure line 19, with an inlet from the modulated pressure conduit 21, with a modulated pressure drain port 22, with an inlet from vehicle speed-dependent pressure conduit 18, with an inlet from the influence conduit 23c, with an inlet from blocking pressure conduit 36a, and with a block pressure drain port 20. The modulated pressure conduit 21 delivers to the signal valve 12 the modulated pressure generated in a modulator valve 26 in inverse proportion to the engine load-dependent pressure. The influence conduit 23c admits the higher of the engine load-dependent pressure and operator actuated limiting pressure, respectively, to the signal valve 12. The signal valve 12 comprises a spool 13 provided with three circumferential lands of different diameters, the first one an outer land 14 of highest diameter having a terminal work face 14a and a work face 14b, the second one an inner land 15 having a work face 15a and 15b wherein the work face 15a is smaller than the work face 14b, and the third one an outer land 16 having a work face 16a wherein the work face 16a is smaller than the work face 15b.

In the initial first, upper position of the spool 13 (shown at the left hand part of spool 13) the terminal work face 14a of the land 14 bears on the internal wall surface 12a and the first land 14 opens the inlet of the blocking pressure of the block pressure conduit 36a to the groove between the opposing work faces 14b and 15a and closes the block pressure drain port 20.

In the initial first position of the spool 13 the second land 15 opens the inlet of modulated pressure conduit 21 to the signal valve 12 and the third land 16 closes the modulated pressure drain port 22, whereby the modulated pressure is allowed to pass from the modulated pressure conduit 21 through the groove between the lands 14 and 15 of the spool 13 to the modulated pressure line 19. The modulated pressure fluid admitted by the modulated pressure conduit 21 flows to the said groove between the lands 15 and 16 of the spool 13 and exerts a force on the oppositely oriented work faces 15b and 16a and as the work face 15b is always larger than the work face 15a, the modulated pressure when admitted to the said groove between the lands 15 and 16 results in an additional force applied to the spool 123 toward its initial first position. The vehicle speed-dependent pressure is proportionate to the vehicle speed and after it rises above the force exerted on the spool 14 by the coil compression spring 17 and by higher of the engine load-dependent pressure and operator actuated limiting pressure respectively, and by the additional force acting on the work face 15b, the spool 13 moves into the alternate second, lower position (as shown at the right hand half of the spool) closing the input of the blocking pressure conduit 36a, opening the blocking pressure drain port 20, closing the input of modulated pressure conduit 21 and opening the modulated pressure drain 22. The land 15 of spool 13 prevents the supply of the modulated pressure to the signal valve 12, whereby the fluid from the modulated pressure line 19 is discharged and the additional force on the work face 15b disappears. The break of the modulated pressure in the modulated pressure line 19 and under the terminal work face 9a results in the shift valve spool 7 returning to the first initial position by action of the spring 8. The spool 13 is forced into the initial first position by a spring 17 and by one of the engine load-dependent pressure and operator actuated limiting pressure respectively; however, due to the absence of the additional force on the work face 15b, the spool 13 will move to the initial first position at a lower speed-dependent pressure and the down shifting of the automatic transmission will be effected at a lower vehicle speed than the shifting of the spool 13 from the initial first position to the alternate second position, i.e. the upshifting of the automatic transmission will be effected at a higher vehicle speed.

The modulated pressure admitted to the signal valve 12 is generated in the modulator control valve 26 provided with an inlet of main pressure second conduit branch 3b, with an inlet of engine load-dependent pressure first circuit branch 23a, with a modulated pressure drain port 31 and outlets of modulated pressure first and second conduit branches 21a and 21b respectively. The modulator valve 26 has a spool 25 provided with three lands; first land 28 having a terminal work face 28a, second land 29 having a work face 29a and third land 30 having a work face 30a and being of higher diameter than the second land 29. The modulated pressure is generated from the main input pressure in inverse proportion to the engine load-dependent pressure admitted to the modulated valve 26 by the conduit 23a. The engine load-dependent pressure exerting the force on the terminal work face 28a shifts the spool 25 to such an extent against the force of the coil compression spring 27 that the land 28 closes by its control edge the main pressure second conduit branch. As the control engine load-dependent pressure increases the generated modulated pressure decreases. The modulated pressure delivered by the modulated pressure first conduit branch 21a returns back to the groove between the land 29 provided with a work face 29a and between the land 30 provided with the work face 30a. As the work face 30a is always larger than the work face 29a, the modulated pressure admitted to the said groove between the lands 29 and 30 results in an additional force applied to the spool 25 in the same direction as the action of the engine load-dependent pressure. When the engine load-dependent pressure increases up and the spool 26 is shifted downwardly to such an extent towards the spring 27 that the control edge of the land 28 closes the input of main pressure second conduit branch, the land 29 opens the modulated pressure drain port 31. The delivery of the modulated pressure is interrupted and the modulated pressure falls down by discharging the modulated pressure through the drain port 31. Due to the drop of the modulated pressure the additional force acting on the spool 25 disappears and the spool 25 moves upwardly by action of the spring 27 so that the land 28 opens the main pressure second conduit branch 3B again to generate the modulated pressure.

To allow the operator to interfere with the above described automatic vehicle speed- and engine load-dependent shifting process the control device includes a pilot shuttle valve 33 comprising a valve casing in which there is a shiftable ball 33a. Ball 33a is selectively movable from a left hand terminal position, shown in the drawing, in which it blocks the passage 34a to a right hand terminal position in which it blocks the passage 23b. The pilot shuttle valve casing 33 has two inlets, the inlet 23b and the inlet of limiting pressure first circuit branch 34a and one outlet to the signal valve 12 through the influence conduit 23c. Said pilot shuttle valve 33 allows the higher of two of said engine load-dependent pressure and operator actuating limiting pressure respectively, to pass through and prevent the lower of said pressures, the engine load-dependent pressure and limiting pressure respectively, to enter the pilot shuttle valve 33. When the engine load-dependent pressure prevails the shuttle valve admits the load-dependent pressure to enter the influence conduit 23c and the spring chamber 24 of the signal valve 12 and to be applied to the spool 13. In case the operator decides to limit the speed range by selecting the first speed ratio, the limiting pressure is actuated by known means of the operator (not shown in the FIGURE) and as the limiting pressure is higher than the load-dependent pressure the pilot shuttle valve 33 closes the input of engine load-dependent pressure second circuit branch 23b and admits the limiting pressure to the spring chamber 24 of the signal valve 12 through the influence conduit 23 whereby the spool 13 of the signal valve 12 is shifted into the initial first position, the spool 7 of the shift valve 6 is shifted into the alternate second position and the first friction engaging means are actuated.

To allow to prevent the upshifting of the transmission to the second gear ratio when the first gear ratio already shifted an additional two-inlet blocking shuttle valve 35 is included in the described control device. The blocking shuttle valve 35 is provided with an inlet of the limiting pressure second circuit branch 34b, with an inlet of a reverse signal pressure conduit 36 and with one outlet to the signal valve 12 through the blocking pressure conduit 36a. In case that a reverse signal pressure being higher than the limiting pressure is applied to the blocking shuttle valve 35 the blocking shuttle valve 35 allows the reverse signal pressure to admit the groove between the opposing work faces 14b and 15a of the spool 13 and as the work face 14b is always larger than the work face 15a, the reverse signal pressure applied to the work face 14b keeps the spool 13 of the signal valve 12 in an initial first position whereby the first gear ratio is maintained in action.

Although the invention is described and illustrated with reference to a single of embodiments thereof, it is to be expressly understood that it is in no way limited to the disclosure of such preferred embodiment but is capable of numerous modifications within the scope of the appended claims.

We claim:

1. In a hydraulic shift control device for an automatic vehicle transmission having two gear ratios shiftable between each other by selectively actuating fluid operated first and second friction engaging means according to the vehicle speed, engine load condition and operator's commands, the hydraulic shift control device comprising:

a shift valve having a spool shiftable between initial first and alternate second position, said spool in initial first position connecting a main input pressure with the second friction engaging means while discharging actuating pressure from the first friction engaging means and in alternate second position connecting the main input pressure circuit with the first friction engaging means, while discharging actuating pressure from the second friction engaging means, said shift spool shiftable from the initial first position to the alternate second position by action of a modulated pressure, the modulated pressure being of inverse proportion to an einge load-dependent pressure, said modulated pressure supplied to the shift valve from a single valve in a modulated pressure line, a modulator valve modulating the main input pressure to produce the modulated pressure, the main input pressure being modulated by the action of the engine load-dependent pressure introduced to the modulator valve from an engine load-dependent pressure circuit, the modulator valve being connected by a modulator pressure conduit with the signal valve, the signal valve, having a spool provided with three circumferential lands of different diameters, the first one an outer land of largest diameter, the seond one an inner land of middle diameter and the third one an outer land of smallest diameter, said spool shitable between an initial first position and an alternate second position by a vehicle speed-dependent pressure acting on the terminal work face of the first land, said spool being urged back into the initial first position by a spring and by the engine load-dependent pressure or by a spring and an operator-actuated limiting pressure, acting on the terminal work face of the third land, said signal valve spool, in the initial first position allowing a modulated pressure to pass from the modulator valve to the shift valve through the groove created between the second land and the third land while preventing drainage of the modulated pressure line connecting said signal valve and said shift valve, and in the second, alternate position draining the modulated pressure line connecting said signal valve and said shift valve while blocking input of the modulated pressure to a signal valve from the modulator valve, a limiting pressure circuit actuable by a vehicle operator, and a pilot shuttle valve including
(1) a first inlet of the engine load-dependent pressure from an engine load-dependent pressure circuit,
(2) a second inlet of limiting pressure from the limiting pressure circuit actuable by the vehicle operator,
(3) an output to the signal valve;

said pilot shuttle valve allowing to the higher of two said engine load-dependent pressure and limiting pressure, respectively, to pass to the signal valve while preventing the lower of said pressures, the engine load-dependent pressure and limiting pressure respectively, to pass through the pilot shuttle valve.

2. A hydraulic shift control device as defined in claim 1, further comprising a blocking shuttle valve including a first inlet of a reverse signal pressure from a reverse signal conduit actuable by a reversing means;

a second inlet of limiting pressure from the limiting pressure circuit actuable by the vehicle operator;

an output to the signal valve;

said blocking shuttle valve allowing the higher of the two of said reverse signal pressure and limiting pressure, respectively, to pass to the signal valve while preventing the lower of said pressures to pass through the block shuttle valve, wherein the signal valve includes in addition;

an input from the blocking shuttle valve allowing the higher of the two said pressures to pass to the groove created between the first and second land of the signal valve spool when the signal spool is in the initial first position, a blocking pressure port allowing drainage of the higher of the two said pressures from said groove when the signal spool is in the alternate second position.

* * * * *